(12) United States Patent
Vishwakarma et al.

(10) Patent No.: US 11,632,259 B1
(45) Date of Patent: Apr. 18, 2023

(54) PAIRING MULTIPLE DEVICES INTO A DESIGNATED GROUP FOR A COMMUNICATION SESSION

(71) Applicant: Lynq Technologies, Inc., Brooklyn, NY (US)

(72) Inventors: Abhishek Vishwakarma, Jersey City, NJ (US); Justin Lange, New York, NY (US); John M. De Cristofaro, Brooklyn, NY (US); Thomas Mwakibinga, New York, NY (US); Shane Wicks, San Carlos, CA (US)

(73) Assignee: Lynq Technologies, Inc., Brooklyn, NY (US)

( * ) Notice: Subject to any disclaimer, the term of this patent is extended or adjusted under 35 U.S.C. 154(b) by 0 days.

(21) Appl. No.: 17/181,673

(22) Filed: Feb. 22, 2021

Related U.S. Application Data

(63) Continuation of application No. 16/363,718, filed on Mar. 25, 2019, now Pat. No. 10,958,463.

(Continued)

(51) Int. Cl.
*H04H 20/71* (2008.01)
*H04L 12/18* (2006.01)
(Continued)

(52) U.S. Cl.
CPC ............ *H04L 12/185* (2013.01); *H04L 43/02* (2013.01); *H04L 51/212* (2022.05); *H04W 4/06* (2013.01);
(Continued)

(58) Field of Classification Search
CPC ....... H04W 72/005; H04W 4/06; H04W 8/26; H04W 4/12; H04W 8/005;
(Continued)

(56) References Cited

U.S. PATENT DOCUMENTS

| 5,130,987 A | 7/1992 | Flammer |
| 6,414,955 B1 * | 7/2002 | Clare .................. H04W 40/246 375/221 |

(Continued)

FOREIGN PATENT DOCUMENTS

| EP | 2355563 A1 * | 8/2011 | .......... H04M 1/7253 |
| WO | 2015028357 | 3/2015 | |
| WO | 2020124514 | 6/2020 | |

OTHER PUBLICATIONS

Piyare et al., "On-Demand LoRa: Asynchronous TDMA for Energy Efficient and Low Latency Communication in IoT," Sensors 2018, 18, 3718, Nov. 1, 2018.

*Primary Examiner* — Phuongchau Ba Nguyen
(74) *Attorney, Agent, or Firm* — Ryan, Mason & Lewis, LLP

(57) ABSTRACT

Methods, apparatus, and processor-readable storage media for pairing multiple devices into a designated group for a communication session are provided herein. An example computer-implemented method includes processing, via at least a portion of multiple processing devices, information associated with a network in connection with one or more device pairing requests from one or more of the processing devices; implementing, via at least one the multiple processing devices, a pairing algorithm, wherein the pairing algorithm comprises searching for one or more of the processing devices, in accordance with one or more temporal values associated with the at least one processing device and at least one of the one or more device pairing requests corresponding thereto, and one or more pairing parameters; and automatically pairing, via the network and based on the pairing algorithm, the at least one processing device to one or more of the processing devices.

20 Claims, 7 Drawing Sheets

Related U.S. Application Data

(60) Provisional application No. 62/648,149, filed on Mar. 26, 2018.

(51) Int. Cl.

| | | |
|---|---|---|
| *H04W 4/12* | (2009.01) | |
| *H04W 4/06* | (2009.01) | |
| *H04W 8/00* | (2009.01) | |
| *H04L 43/02* | (2022.01) | |
| *H04W 72/04* | (2023.01) | |
| *H04W 76/14* | (2018.01) | |
| *H04L 51/212* | (2022.01) | |

(52) U.S. Cl.
CPC ............ *H04W 4/12* (2013.01); *H04W 8/005* (2013.01); *H04W 72/0413* (2013.01); *H04W 76/14* (2018.02)

(58) Field of Classification Search
CPC .......... H04W 72/0413; H04W 72/121; H04W 72/1263; H04W 76/14; H04W 76/40; H04L 12/189; H04L 12/185; H04L 43/02; H04L 51/212; H04L 51/12; H04B 1/7136; H04B 1/7143; H04B 1/715; H04B 1/7156; H04B 2001/71362; H04B 2001/71367; H04B 2001/7154; H04B 2001/71566; H04B 2201/71323; H04B 2201/71384
See application file for complete search history.

(56) References Cited

U.S. PATENT DOCUMENTS

| | | | |
|---|---|---|---|
| 7,185,099 B1 | 2/2007 | Block | |
| 8,457,798 B2 | 6/2013 | Hackett | |
| 8,557,798 B2 | 10/2013 | Iserloh | |
| 8,954,003 B2 | 2/2015 | Chen | |
| 9,614,891 B1 | 4/2017 | Evenson | |
| 9,621,659 B1 | 4/2017 | Ghazanfari | |
| 9,818,315 B2 | 11/2017 | Hiltunen et al. | |
| 10,149,280 B2 | 12/2018 | Baghel et al. | |
| 10,834,738 B2* | 11/2020 | Paycher | H04W 72/1215 |
| 10,904,899 B1* | 1/2021 | Vishwakarma | H04W 76/40 |
| 10,958,463 B1* | 3/2021 | Vishwakarma | H04B 1/7136 |
| 2001/0050945 A1 | 12/2001 | Lindsey | |
| 2002/0154210 A1 | 10/2002 | Ludwig et al. | |
| 2004/0103196 A1 | 5/2004 | Block et al. | |
| 2006/0245470 A1 | 11/2006 | Balachandran et al. | |
| 2007/0201698 A1* | 8/2007 | Huh | H04L 63/061 380/256 |
| 2012/0294163 A1 | 11/2012 | Turtinen et al. | |
| 2013/0101104 A1 | 4/2013 | Wishart | |
| 2013/0107817 A1 | 5/2013 | Yuan et al. | |
| 2013/0318157 A1* | 11/2013 | Harrison | G06F 21/53 709/203 |
| 2014/0177458 A1 | 6/2014 | Novak | |
| 2014/0376381 A1 | 12/2014 | Yuan | |
| 2015/0163789 A1 | 6/2015 | Vasudevan | |
| 2015/0208384 A1 | 7/2015 | Baghel | |
| 2015/0222325 A1 | 8/2015 | Sellier et al. | |
| 2015/0245167 A1* | 8/2015 | Bobrow | H04L 67/51 455/41.2 |
| 2015/0271860 A1 | 9/2015 | Baghel | |
| 2016/0050637 A1* | 2/2016 | Behravan | H04L 5/0048 370/350 |
| 2016/0112090 A1 | 4/2016 | Mason et al. | |
| 2016/0112411 A1 | 4/2016 | Shy | |
| 2016/0125733 A1* | 5/2016 | Sallas | G08C 17/02 398/106 |
| 2018/0176947 A1 | 6/2018 | Yu | |
| 2019/0274168 A1 | 9/2019 | Hwang et al. | |
| 2019/0373635 A1 | 12/2019 | Yang et al. | |
| 2020/0356943 A1* | 11/2020 | Strom | G06Q 10/087 |
| 2021/0243772 A1 | 8/2021 | Xu | |
| 2022/0015111 A1* | 1/2022 | Guo | H04W 72/1268 |
| 2022/0346091 A1* | 10/2022 | Karmoose | H04L 1/0067 |

\* cited by examiner

| 806.734, | 807.814, | 808.884, | 809.874, | 811.054, | 812.134, | | |
| 817.534, | 818.814, | 819.694, | 820.774, | 821.854, | 822.934, | 802.414, | 803.484, 804.574, 805.654, |
| 802.374, | 803.454, | 804.534, | 805.614, | 806.694, | 807.774, | 813.214, | 814.294, 815.374, 816.454, |
| 813.174, | 814.254, | 815.334, | 816.414, | 817.494, | 818.574, | 824.014, | 825.094, 826.174, 827.254, |
| 823.074, | | | | | | 808.854, | 809.934, 811.014, 812.094, |
| | | | 826.134, | 827.214, | 828.294, | 819.654, | 820.734, 821.814, 822.894, |
| | | | | | 803.414, | 804.494, | 805.574, 826.654, 827.734 |

PAIRING MULTIPLE DEVICES INTO A DESIGNATED GROUP FOR A COMMUNICATION SESSION

CROSS-REFERENCE TO RELATED APPLICATIONS

The present application is a continuation of U.S. patent application Ser. No. 16/363,718, filed Mar. 25, 2019, which claims priority to U.S. Provisional Patent Application Ser. No. 62/648,149, filed Mar. 26, 2018, which is incorporated by reference herein. Additionally, the present application is related to U.S. patent application Ser. No. 16/363,722, filed Mar. 25, 2019, and U.S. patent application Ser. No. 16/363,727, filed Mar. 25, 2019, both of which are incorporated by reference herein.

FIELD

The field relates generally to information technology, and more particularly to network communication management.

BACKGROUND

Connecting devices and transmitting information among and/or between the devices in a network faces numerous challenges in conventional approaches. For example, latency issues are common due, in part, to geographic variables. Additionally, interference issues can arise when multiple devices are attempting to transmit information within the same relative area and/or proximity. Further, regulatory requirements and a need to coordinate with a central registry of channel use can often limit the scope of one or more communication-related parameters. Accordingly, a need exists for improvements over conventional network communication approaches.

SUMMARY

Illustrative embodiments of the disclosure provide mechanisms for pairing multiple devices into a designated group for a communication session. An example computer-implemented method includes processing, via at least a portion of multiple processing devices, information associated with a network in connection with one or more device pairing requests from one or more of the multiple processing devices. The method also includes implementing, via at least one the multiple processing devices, at least one pairing algorithm, wherein the at least one pairing algorithm comprises searching for one or more of the multiple processing devices, in accordance with (i) one or more temporal values associated with the at least one processing device and at least one of the one or more device pairing requests corresponding thereto, and (ii) one or more pairing parameters. Further, the method additionally includes automatically pairing, via the network and based at least in part on the at least one pairing algorithm, the at least one processing device to one or more of the multiple processing devices.

In another embodiment, an example system includes a communications network and multiple processing devices, each of the multiple processing devices configured to process information input by a respective user in connection with a request to pair the processing device to one or more of the other processing devices, wherein the information comprises a given number of the multiple processing devices to which the respective user is attempting to pair the processing device. Additionally, each of the multiple processing devices in the system is also configured to implement a pairing algorithm, wherein the pairing algorithm comprises monitoring, over the communications network, for communications from the other processing devices, wherein the communications (i) comprise a request to pair to the given number of the multiple processing devices, (ii) are in accordance with one or more temporal values associated with the processing information input by the respective user, and (iii) are in accordance with and one or more pairing parameters. Further, each of the multiple processing devices in the system is additionally configured to a distinct pairing mode configuration upon successful completion of the pairing algorithm, and to establish an exclusive communication session over the communications network with the given number of the multiple processing devices configured to the distinct pairing mode configuration.

Illustrative embodiments can provide significant advantages relative to conventional network communication approaches. For example, common challenges associated with conventional approaches (such as noted above) are overcome by one or more embodiments via preclusion of a need for a centralized communication requirement. Additionally, implementation of one or more embodiments render communications less prone to interference and/or interception.

These and other illustrative embodiments described herein include, without limitation, methods, apparatus, networks, systems and processor-readable storage media.

BRIEF DESCRIPTION OF THE DRAWINGS

FIG. 2 is a diagram illustrating a table of hopping frequencies in an example embodiment;
FIG. 4 is a diagram illustrating a table of sorted active hopping frequencies in an example embodiment.

DETAILED DESCRIPTION

As detailed herein, one or more embodiments include techniques and/or mechanisms for pairing multiple devices into a designated group for a communication session. Further, in at least one embodiment, pairing logic used to pair the devices into a designated group depends on a temporal value (such as a timestamp, for example) and a code. Additionally, in such an embodiment, the pairing yields a common frequency hopping schedule applicable to the paired devices, and this schedule is shared with the paired devices (for example, shared in an encoded manner). Also, in one or more embodiments, a time-slotted response queue is negotiated among the paired devices, wherein the slot queue defines the relevant device identifier (ID) and the type of data being transmitted. Accordingly, each time slot implicitly addresses a device and implicitly specifies the type of data in question.

As used herein, spread spectrum frequency hopping, also known as frequency-hopping spread spectrum (FHSS), refers to a method of transmitting radio signals by switching a carrier among multiple frequency channels, using a pseudo-random sequence known to both the transmitter and the receiver. The frequency channels used are referred to as a "hop set," and include a set of channels selected from all available bandwidths over which the transmitter and receiver will switch (that is, "hop") during the course of sending data.

At least one embodiment includes generating and implementing a radio protocol and broadcast schema designed based on an intention to return (for users of the relevant user devices), user experience considerations, and limits on power, bandwidth and temporal variables associated with user devices. Additionally, in one or more embodiments, such groups of two or more devices transmit data packets to each other during a given session, wherein the data packets contain geo-location information identifying the positioning/location of the devices. Further, as detailed herein, at least one embodiment includes permitting devices to pair together in a variety of different locations, each with (potentially) different specific regulatory requirements, without requiring a central registry of channel use.

Example and/or illustrative embodiments of the disclosure will be described herein with reference to exemplary networks and associated computers, servers, network devices or other types of processing devices (also referred to herein as user devices). It is to be appreciated, however, that the invention is not restricted to use with the particular illustrative network and device configurations shown. By way of example, the term "network" as used herein is intended to be broadly construed, so as to encompass, for example, any system comprising multiple networked processing devices.

Figure 1:
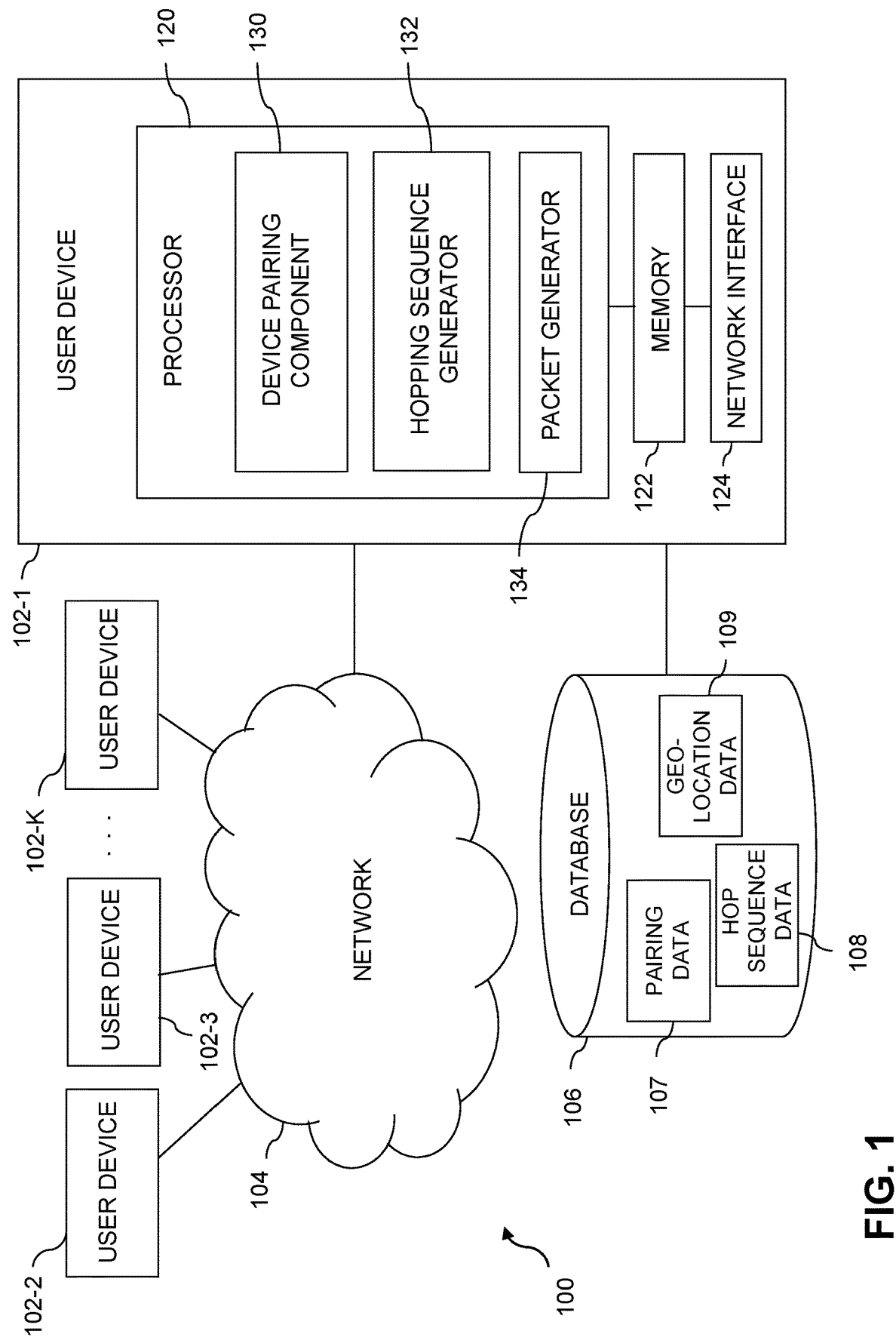
FIG. 1 is a block diagram of a network configured for user device communication in an example embodiment.

FIG. 1 shows a network 100 configured in accordance with an example embodiment. The network 100 includes a plurality of user devices 102-1, 102-2, 102-3, . . . 102-K, collectively referred to herein as user device(s) 102. The user devices 102 are coupled to a network 104, where the network 104 in such an embodiment is assumed to represent a sub-network or other related portion of the larger network 100. Accordingly, elements 100 and 104 are both referred to herein as examples of "networks," but element 104 is assumed to be a component of element 100 in the context of the FIG. 1 embodiment.

The user devices 102 can include, for example, location data tracking hardware devices, as well as mobile telephones or smart phones, laptop computers, tablet computers, desktop computers or other types of computing devices. The user devices 102, as illustrated in FIG. 1, can connect (preferably wirelessly, but also plausibly via a hard-wired connection) to each other via network 104. Accordingly, an example embodiment such as that depicted in FIG. 1 includes location data tracking hardware devices (102) wirelessly connected to each other via network 104.

Referring again to FIG. 1, in one or more embodiments, each user device 102 is assumed to be implemented using at least one processing device. Each such processing device generally includes at least one processor and at least one associated memory, and implements one or more functional software modules or components for controlling certain features of the user device 102. Also, in at least one embodiment, each user device 102 can be coupled to and/or contain therein a power source such as, for example, a battery.

In the example embodiment illustrated in FIG. 1, the user devices 102 each include a processor 120 coupled to a memory 122 and a network interface 124.

The processor 120 can include, for example, a microprocessor, a microcontroller, an application-specific integrated circuit, a field-programmable gate array or other type of processing circuitry, as well as portions or combinations of such circuitry elements.

The memory 122 can include, for example, random access memory (RAM), read-only memory (ROM) or other types of memory, in any combination. The memory 122 and other memories disclosed herein can also be viewed as examples of processor-readable storage media, which can store executable computer program code and/or other types of software programs.

Examples of such processor-readable storage media can include, by way merely of example and not limitation, a storage device such as a storage disk, a storage array or an integrated circuit containing memory, as well as a wide variety of other types of computer program products. The term "processor-readable storage media" as used herein should be understood to exclude transitory, propagating signals.

The network interface 124 allows the user devices to communicate over the network 104 with one or more other user devices 102, and can include, for example, one or more conventional transceivers.

Additionally, in one or more embodiments, the user devices 102 can be coupled to one or more additional devices such as mobile telephones, laptop computers, tablet computers, desktop computers or other types of computing devices.

As further detailed herein, two or more of the user devices 102, in one or more embodiments, can be coupled to each other to form an associated grouping (also referred to herein as a "squad"). Numerous other operating scenarios involving a wide variety of different types and arrangements of processing devices and networks are possible, as will be appreciated by those skilled in the art.

Also, it is to be appreciated that the term "user" herein is intended to be broadly construed so as to encompass, for example, human, hardware, software or firmware entities, as well as various combinations of such entities.

The network 104 is assumed to include a portion of a global computer network such as the Internet, although other types of networks can be part of the network 100, including a wide area network (WAN), a local area network (LAN), a satellite network, a telephone or cable network, a cellular network, a wireless network such as a LoRa, LoRa-WAN, Sigfox or other LPWAN network, a Wi-Fi, or WiMAX network, or various portions or combinations of these and other types of networks. Also, the network 100, in one or more embodiments, can include combinations of different types of networks, each including processing devices configured to communicate using internet protocol (IP) or other related communication protocols.

Each user device 102 has an associated database 106 configured to store data related to communications among and between user devices 102. The database 106 (which can be resident on the user device 102 or accessible to the user device via network 104) more particularly stores pairing data 107, which can include information about user devices paired together in squad for a given session, hop sequence data 108, which can include information pertaining to the frequency channels (and order of use thereof) used in a given squad session, and geo-location data 109, which can include position information associated with the user device 102 (and/or one or more other user devices 102 in a squad).

In at least one embodiment, database 106 can be implemented using one or more storage systems associated with the corresponding user device 102. Such storage systems can comprise any of a variety of types of storage including network-attached storage, storage area networks, direct-attached storage and distributed direct-attached storage, as well as combinations of these and other storage types, including software-defined storage.

Referring again to the depiction of user devices 102, the processor 120 can also include a device pairing component 130, a hopping sequence generator 132, and a packet generator 134.

It is to be appreciated that this particular arrangement of modules 130, 132 and 134 illustrated in the processor 120 of the FIG. 1 embodiment is presented by way of example only, and alternative arrangements can be used in one or more other embodiments. For example, the functionality associated with the modules 130, 132 and 134 in other embodiments can be combined into a single module, or separated across a number of modules. By way of further example, multiple distinct processors can be used to implement different ones of the modules 130, 132 and 134, or portions thereof.

Also, at least portions of the device pairing component 130, hopping sequence generator 132, and packet generator 134 can be implemented at least in part in the form of software that is stored in memory 122 and executed by processor 120.

Further, example processes utilizing device pairing component 130, hopping sequence generator 132, and packet generator 134 of the user devices 102 in network 100 are further described herein.

It is to be understood that the particular set of elements shown in FIG. 1 for communication techniques involving user devices 102 of network 100 is depicted by way of illustrative example only, and in one or more other embodiments, additional or alternative elements may be used.

At least one embodiment includes pairing devices to form a group (also referred to herein as a squad). In pairing, information is exchanged between two or more devices. Such information can include the number of devices in the (desired) paired squad of devices. By way of illustration, assume that a number of devices—say, four—make a pairing request, wherein each of the devices indicates that it is attempting to pair with three other devices (to form a squad of four devices). As such, in at least one embodiment, a pairing algorithm is carried out by each of the devices, and the pairing algorithm searches for other devices that have recently made a pairing request for the same number of (squad) devices. In one or more embodiments, the pairing algorithm can also apply one or more filtering techniques, filtering based on parameters such as time and/or radio signal strength.

By way merely of illustration, the following includes an example of a pairing sequence involving multiple user devices (such as user devices 102). After a power-on or reset operation, a user is prompted via a user device to enter a pairing mode and/or operation. Additionally, the user device confirms that it has the coordinated universal time (UTC). If not (that is, the UTC is not available), an error message is displayed via the user device (for example, such a message can indicate "need sky view to begin pairing"). Assuming that the user device has the UTC, the user device prompts the user to enter the number of additional user devices desired for the group (also referred to herein as "squad").

Subsequently, the user device enters a pairing mode of operation, which includes the user device switching to a radio setting designated exclusively for pairing. By way merely of example, such a setting can include particular LoRa modem settings within categories of spreading factor, bandwidth, coding rate, low data rate and transmission power and frequency. For instance, in such an example, the spreading factor can be set to approximately seven, the bandwidth can be set to 500 kilohertz (kHz), the coding rate (also referred to as error correction) can be set to a maximum of 4/8, the low data rate optimization can be set to "OFF," the frequency can be set to 925 megahertz (MHz), and transmission power can be set to 5 decibels (dB). Additionally, in one or more embodiments, the front-end module (FEM) settings associated with the user device in this setting can include the low noise amplifier being set to "OFF," and the power amplifier being set to "OFF." Further, in such an embodiment, packet configurations for the user device in such a setting can include a particular programmed preamble, preamble length, header mode (explicit/implicit), cyclic redundancy check (CRC) enable/disable designation, etc. For instance, in at least one embodiment, pairing settings include a header mode that is explicit, and CRC that is disabled (while an internal checksum mechanism may still be used).

Also, with respect to the radio setting designated exclusively for pairing, the user device can initialize a number of exit conditions. By way of example, the user device can implement a pairing timeout timer (via a scheduler), wherein such a timer can encompass approximately one minute, for instance. Additionally, the user device can implement a pairing group size parameter, wherein the pairing operation is completed/exited upon the pairing of the specified number of devices.

While exiting conditions are not met, the user device begins or continues the pairing protocol, which includes a multicasting node discovery procedure. In the multicasting node discovery procedure, in accordance with one or more embodiments, each user device in a group/squad begins alternately communicating and listening asynchronously. Each device listens only to those packets that are stronger than a predetermined received signal strength indicator (RSSI) threshold (for example, approximately −50, or whatever value provides an effective fade margin (such as 10 dB)) when the devices are within a given distance (for example, 50 millimeters (mm) of each other). Each device builds a "discovery" table based on a unique device identifier (ID) received from remote devices (packets not meeting the RSSI threshold requirements are ignored). Additionally, for each device, once the number of unique devices in its discovery table is equal to the intended squad size, the device adds an acknowledgement message with this number to its broadcast as a "complete discovery table acknowledgement." Further, in at least one embodiment, for each device, the multicasting node discovery procedure is complete only when the device has a complete discovery table as well as a "complete discovery table acknowledgement" from each of the other devices in the group/squad.

The user device exits/completes the pairing mode of operation by evaluating the pairing protocol scheme results. A successful pairing result can include the following. The user device generates and displays a prompt indicating a "successful pairing" message. Additionally, the user device updates one or more time-division multiplexing (TDM) variables, which are prerequisite for normal mode of operation, following the slot allocation and assignment mechanism associated with the completed pairing. Each device (in the paired group/squad) sorts the "discovery" table numerically based on device ID (for example, sorted low to high). In at least one embodiment, the sorted ordering of device IDs subsequently determines each device's chronological slot position and time to communicate and listen (during the subsequent group/squad communication session).

Also, in one or more embodiments, a preliminary radio frequency (RF) schema can include all devices sharing the same frequency, but utilizing time-division multiple access (TDMA). A production mode RF schema can include each device, knowing both (a) the number of devices/units in the group/squad and (b) its position within this list, consulting an internal list of frequencies known at compile time that govern when and at what frequency it may transmit.

Referring again to a successful pairing result, at least one embodiment also includes switching the mode of operation (for the devices in the group/squad) to "normal" mode (which can include group node "localization"); that is, the familiar mode of operation to the end user.

In contrast to the above-described embodiments, a failed pairing result can include the following. The user device generates and displays a prompt indicating a "failure pairing" message, optionally with a human-readable error explaining what went wrong during the pairing protocol. For example, if one of the user devices (in the group/squad) did not have UTC, such a failure message might indicate that "[number] other device(s) need(s) to have three minutes of sky view before the device(s) can be paired." Additionally, if the intended/desired squad size entered by all of the relevant user devices does not agree (that is, the devices did not all enter the same number), a failure message might indicate that "you wanted to pair [number] units but at least one other user entered [different number]." If the number of user devices found and/or located was less than the "intended squad size," a failure message might indicate that "You wanted to pair a total of [number] devices, but only [smaller number] devices were found. Try again, and make sure that all devices are in pairing mode." Further, if the number of user devices found was more than the "intended squad size," a failure message might indicate that "You wanted to pair a total of [number] devices, but [larger number] devices were found. Try again, and make sure to choose the correct total number of devices to be paired."

Continuing with an example of a squad of four units, subsequent to pairing, the system may set a minimum size to the hop set to be used in the communications transmitted within this squad. For example, in one or more embodiments, a hop set of at least 50 hopping channels is required to be used by a squad during a given squad session. In at least one embodiment, a squad session can persist indefinitely, until a device is shutdown or paired with other devices, or a different number of the same devices. Accordingly, in at least one embodiment, a leader device (from the given squad) can implement an algorithm to create a hop set to be used by all of the devices in the given squad during the given squad session. As further described herein, a "leader" device can include, for example, the first device from the given squad to submit its pairing request. After establishing the hop set for the squad session, the devices in the given squad will then iteratively, in a given order (for example, a round robin arrangement), transmit information using, iteratively in a given order, all of the frequency channels in the hop set.

By way merely of example and not limitation, consider a squad of four devices: Device1, Device2, Device3 and Device4. Also, in this example, assume that a hop set of five channels has been established by the lead device of the squad: ChannelA, ChannelB, ChannelC, ChannelD and ChannelE. Communication among the devices in this squad, per this example, can subsequently be carried out as follows: Device1 transmits geo-location information pertaining to Device1 on ChannelA (while Device2, Device3 and Device4 listen); Device2 transmits geo-location information pertaining to Device2 on ChannelB (while Device1, Device3 and Device4 listen); Device3 transmits geo-location information pertaining to Device3 on ChannelC (while Device 1, Device2 and Device4 listen); Device4 transmits geo-location information pertaining to Device4 on ChannelD (while Device1, Device2 and Device3 listen); Device1 transmits geo-location information pertaining to Device1 on ChannelE (while Device2, Device3 and Device4 listen); Device2 transmits geo-location information pertaining to Device2 on ChannelA (while Device1, Device3 and Device4 listen); etc. Such an arrangement as detailed in the above example can also be referred to as time-division multiplexing. Further, the above example contains a sequential ordering of channels in the hop set, which is merely an example embodiment. The squad (or a leader device of the squad) can determine an alternate (or a random) ordering of the channels in the hop set in one or more embodiments. Additionally, as evidenced by the above example, in one or more embodiments, relatively even short- and long-term distribution of devices in the squad to channels in the hop set can be achieved.

Further, in one or more embodiments, each device in a given squad is informed of (by the leader device, for example) the sequence of devices (in the squad) with respect to communicating/transmitting information over the hop set. Also, each individual period/slot of communication/transmission in a squad session can be, in at least one embodiment, pre-designated as a certain duration of time. Accordingly, in such embodiments, each device in the squad can track and identify which device (in the squad) is communicating/transmitting at a given point in time based on the knowledge of the device sequence or the pre-designation temporal duration of each communication/transmission period/slot.

As detailed herein, one or more embodiments include implementing a frequency hopping spread spectrum system. By way merely of example and not limitation, in such an embodiment, each device can use LoRa modulation techniques over 902-928 MHz industrial, scientific, and medical radio band (ISM band; namely, the American ISM band; it is to be appreciated that bandwidth parameters can differ in other countries and/or jurisdictions) with frequency hopping spread spectrum, and can (generally) operate in various modes that can include a "normal" mode and a "pairing" mode.

In a normal mode, in accordance with one or more embodiments, a device can utilize a minimum of 50 hopping frequencies at 15 kHz bandwidth (BW). In such a mode, the transmit (TX) power level does not exceed a maximum of one watt (W). Additionally, in such a mode, the dwell time at any channel does not exceed 400 milliseconds (mS). The channel separation can be set to 25 kHz because the 20 dB BW of the hopping channel is less than 25 kHz.

In a pairing mode, by way merely of example, a device can utilize only one frequency but at approximately 500 kHz. Additionally, in such a mode, the TX power can be configured to not exceed a maximum of approximately 15 milliwatts (mW).

Also, in connection with at least one embodiment, for frequency hopping systems operating in the 902-928 MHz band, if the 20 dB bandwidth of the hopping channel is less than 250 kHz, the system shall use at least 50 hopping frequencies and the average time of occupancy on any frequency shall not be greater than 0.4 seconds within a 20 second period.

As described herein, one or more embodiments include generating a hopping sequence to be used in a squad session. By way merely of example, in such an embodiment, the modulation BW for every hopping frequency can be fixed at 15 kHz. The hopping list for operation over 902-928 MHz ISM band can be generated based on the number of devices in a squad $N_{nodes}$ (minimum=2, example maximum=12) such that size of the hopping list is greater than 50 and exactly one less than a multiple of the squad size. Accordingly, in such an example embodiment, the following process can be carried out.

A start offset ($F_{offset}$) between 0 and 0.500, representing kHz, is randomly selected and/or generated to define the lowest hopping frequency. As such, (902.00+$F_{offset}$+channel spacing)=$F_{start}$. This offset value is then shared between all devices in the squad.

Additionally, an example embodiment includes calculating the number of possible channels. Specifically, the number ($N_{fstepLegal}$) of legal hopping frequencies between $F_{start}$ and $F_{stop}$ (928.0−channel spacing) can be calculated via one or more functions (channel BW, channel spacing, etc.). Beginning with $F_{start}$, at least one embodiment includes iteratively adding $N_{fstepLegal}$ to calculate the frequency values of all possible channels. These frequencies can then be stored in a lookup table (referred to herein as "Legal $F_{step}$ Values") of size $N_{fstepLegal}$ that can be indexed with an integer. Because all devices in the squad utilize the same offset value, each device's lookup table will be equal in size and contain the same frequency values for each table entry.

Also, one or more embodiments include, using one or more functions, calculating a value $N_{fstepActive}$ as the lowest integer value that meets the following conditions: the value is higher than the legal minimum number of hopping frequencies required by a particular legal jurisdiction or technical context, and is also coprime with the number of units being paired, also referred to herein as "squad size." For example, if the minimum number of hopping frequencies is 50, at least one embodiment includes determining the smallest multiple of the squad size that is greater than 50, and then adding one to that number.

At least one embodiment additionally includes producing $R_{selectionOffset}$, which is a new random number that satisfies the following conditions: the number is not a divisor of $N_{fstepLegal}$, and the number is between 25 and 50. In such an embodiment, $R_{selectionOffset}$ is subsequently shared between all devices in the squad.

Also, beginning with index position zero (0), one or more embodiments include iterating through the index of table "Legal $F_{step}$ Values" at intervals of $R_{selectionOffset}$ to select the number of frequencies that will be used by the squad, and subsequently add these entries to a new lookup table (referred to herein as "Squad Frequencies") which contains only these frequencies until a total of $N_{fstepActive}$ frequencies are ultimately selected. In such an embodiment, the iterator can wrap around such that if the iterator value exceeds $N_{fstepLegal}$, the iterator value is set to itself minus $N_{fstepLegal}$. As used herein, an iterator refers to a programming operation that may traverse through an ordered set of data, such as a list, and select every $N^{th}$ element, so that these elements can be copied, moved, reordered or otherwise manipulated.

Figure 2:
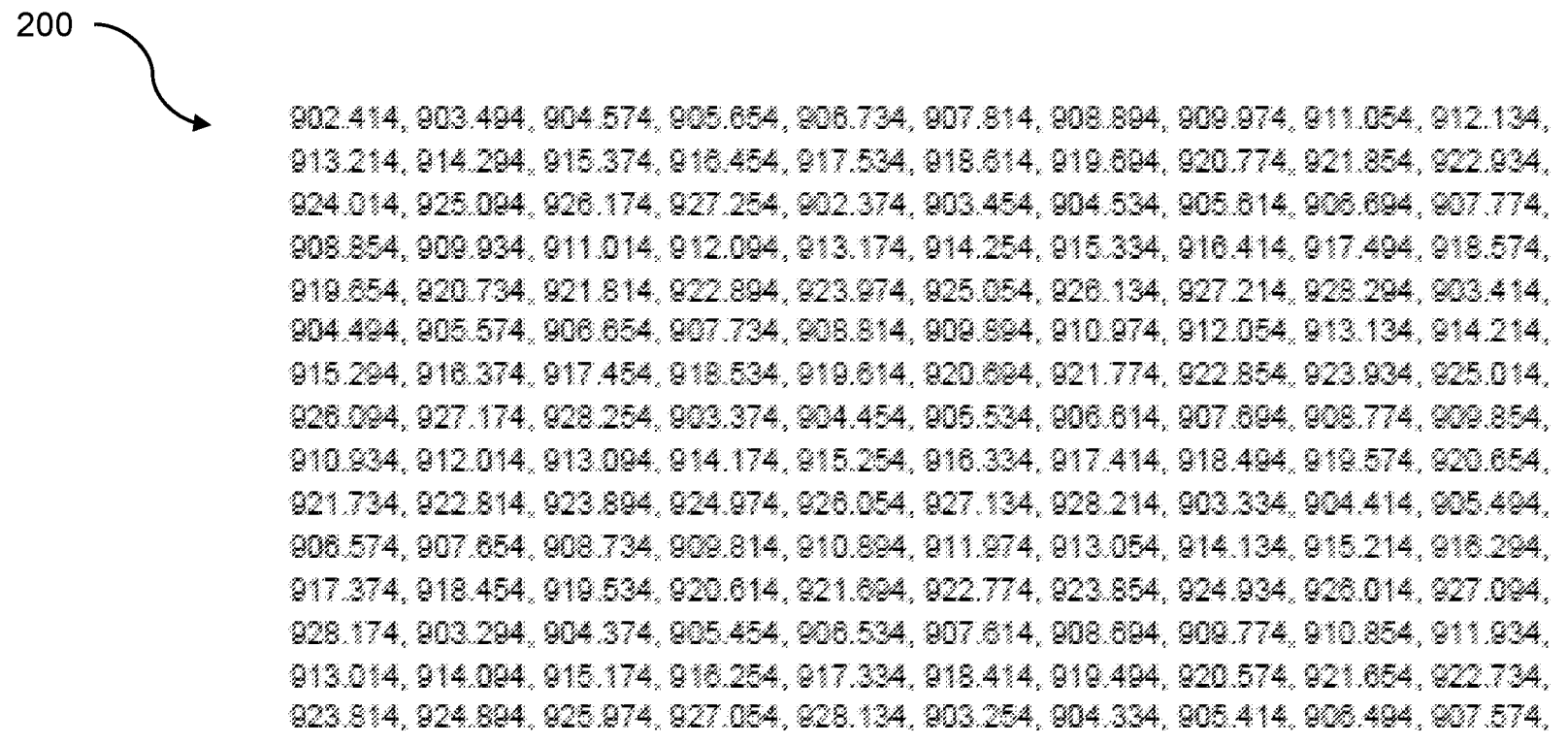
Figure 2:
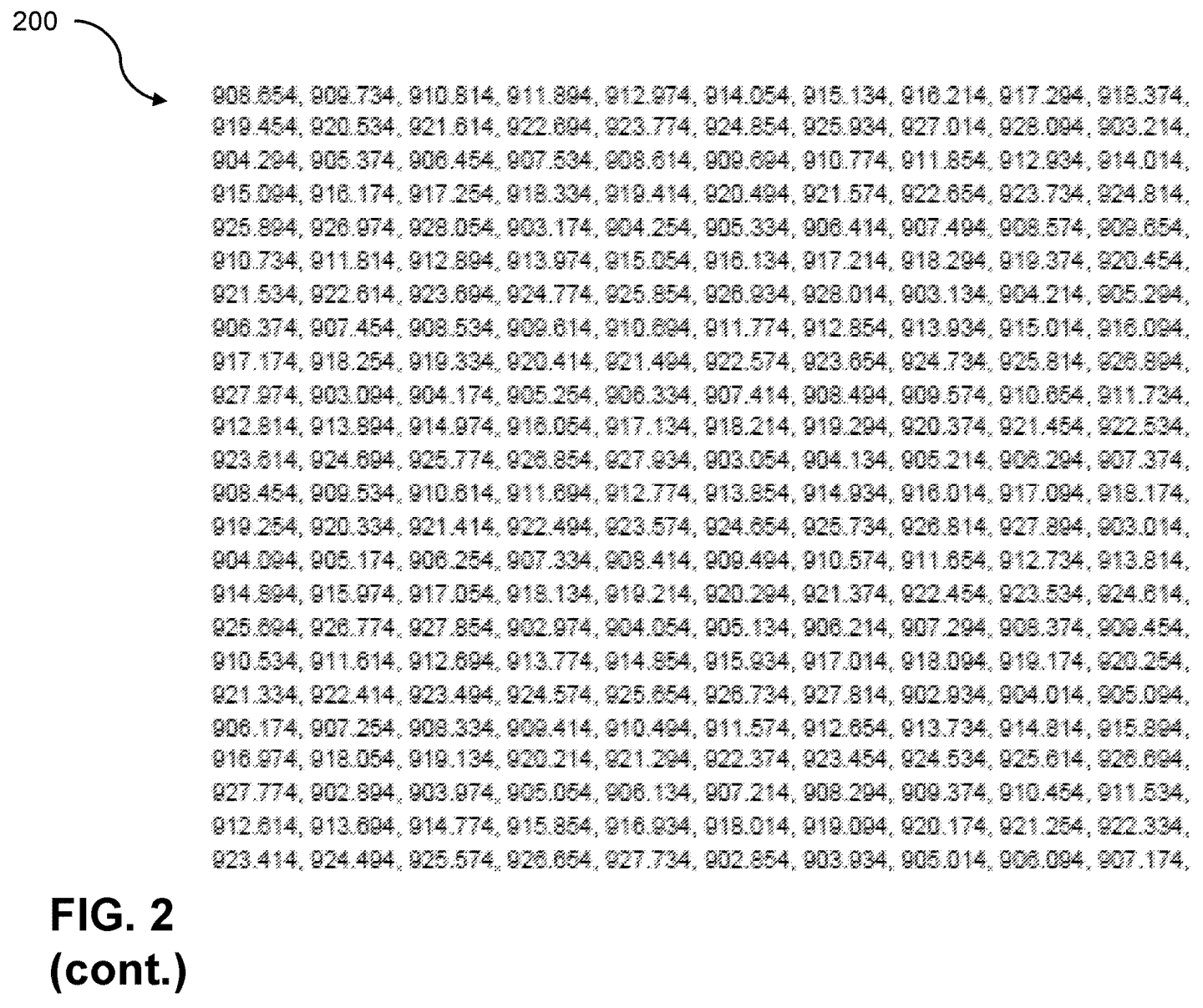
Figure 2:
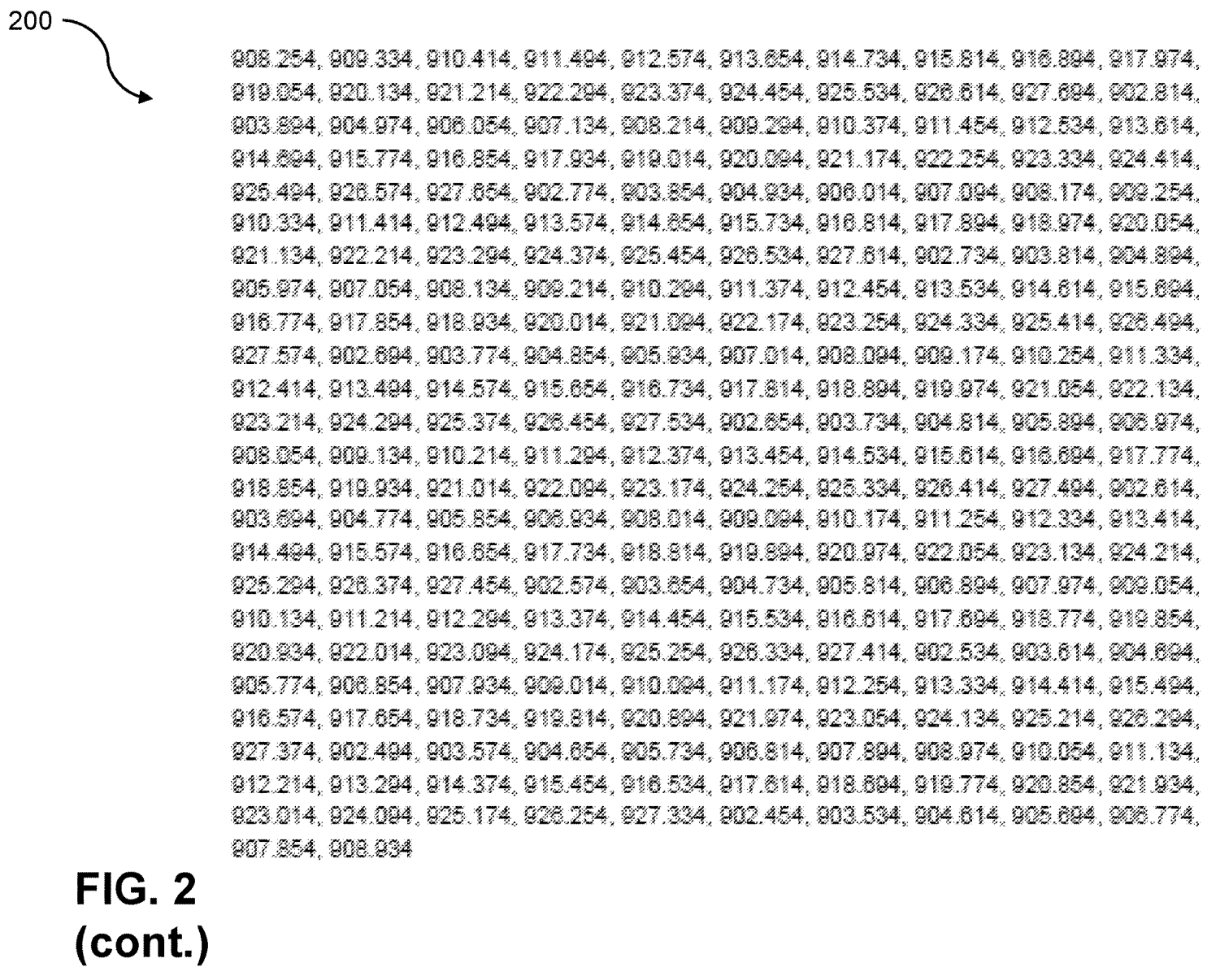

By way merely of illustration, consider the following description of example hopping sequence channels, which are determined during the pairing process using a combination of user-inputted values such as, for example, squad size, geo-location-specific values relative to radio law (such as minimum hopping channels and channel spacing), and random values derived from random seed functions. Using techniques such as those detailed above, and for an example squad of size 12, the following values can be generated. Channel spacing, for example can be set at 25, equating to 25 kHz. For $F_{offset}$, an example random value of 349 can be generated. The summation of these values (902.00+0.025+0.349) produces a value for $F_{start}$ of 902.374. The calculated value for $F_{offset}$ is shared among all devices in a squad, which is sufficient for each device to produce the same $F_{start}$ value of 902.374. Additionally, in this example, a value of 649 is produced for $N_{fstepLegal}$. Further, a table of all legal hopping frequencies can be produced that contains all legal hopping channels within the ISM bandwidth for the given parameters (BW and $F_{offset}$). An example of such a table is depicted in FIG. 2, which illustrates a table 200 of (legal) hopping frequencies in an example embodiment.

Continuing with the above example, based on the squad size of 12 devices, a value of 71 is calculated for $N_{fstepActive}$, and a value of 27 is produced for $R_{selectionOffset}$ by the lead pairing device and is shared with all other devices in the squad. A table of all active hopping frequencies produced that contains only those frequencies that will be used for the frequency hopping frequencies of the squad can be generated and implemented by each of the devices in the squad. An example of such a table is depicted in FIG. 3, which illustrates a table 300 of (active) hopping frequencies in an example embodiment.

Figure 3:
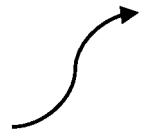
FIG. 3 is a diagram illustrating a table of active hopping frequencies in an example embodiment.

In one or more embodiments, such a table (as depicted in FIG. 3, for example) of active hopping frequencies can be pseudo-randomly sorted, such that the direction and magnitude of the change from one hopping channel to another appears random. An example of such a sorted table is depicted in FIG. 4, which illustrates a table 400 of sorted active hopping frequencies in an example embodiment.

Also, in at least one embodiment, each individual device in a squad meets a requirement that each of the device's hopping channels is used equally on average (for example, that each new transmission event begins on the next channel in the hopping sequence after the final channel used in the previous transmission event). In such an embodiment, all devices in the squad transmit one at a time at even intervals in the same order, in a round robin fashion. After a first device (in the squad) finishes transmitting a packet, the device switches to the next frequency in the hopping list. A second device in the squad then transmits on the second frequency in the hop list. The third device in the squad then transmits on the third frequency in the hop list, and so on.

Because the number of frequencies in the hop list is one less or one more than an even multiple of the devices in the squad, each device in the squad will traverse through its entire hop list prior to using any hopping channel for the second time. Moreover, in such an embodiment, no device in the squad will use any hopping channel in the hop list for a second time until every device in the squad has used each hopping channel precisely once. This periodicity ensures that all hopping channels are used equally on average, as considered from the perspective of each device in the squad as well as considered from the perspective of the squad as a whole.

Also, in at least one embodiment, the receiver(s) associated with a squad and/or squad session has the ability to shift frequencies in synchronization with the transmitted signals. In such an embodiment, all devices in the squad except for the unit that is transmitting are considered receivers for the duration of time that another unit is transmitting. All devices in the squad can be equipped, for example, with a global navigation satellite system (GNSS) receiver, which can provide an accurate absolute reference to time. Each device in a squad, regardless of whether it is receiving or transmitting, is therefore able to shift frequencies in a synchronized manner.

Further, one or more embodiments include avoiding simultaneous occupancy of individual hopping frequencies by multiple transmitters. Because each squad shares a randomly generated $F_{offset}$ value and a randomly generated $F_{start}$ value, its table of frequency hopping frequencies is unique to the devices in the squad and unique to this single instance of a squad of that size. Accordingly, only those devices paired as a squad share this frequency hopping list. A squad of the same number of devices will necessarily have its own, unique frequency hopping list.

As detailed herein, at least one embodiment includes facilitating trade-offs between data throughput (bandwidth) and transmission range. For example, in an example embodiment, the rate of data throughput is decreased—making the data travel more slowly—the data can travel farther at the same cost and power.

One or more embodiments include generating and utilizing what are referred to herein as long packets and short packets. As used herein, long packets can travel greater distances than short packets, and long packets are transmitted at a lower rate of data throughput than are short packets. By way merely of illustration, consider again the example detailed above wherein a squad includes four devices communicating over a hop set of five channels. Communication among the devices in this squad, per a further example, can subsequently be carried out as follows: Device1 transmits a long packet (containing geo-location information pertaining to Device1) on ChannelA (while Device2, Device3 and Device4 listen); Device2 transmits a short packet (containing geo-location information pertaining to Device2) on ChannelB (while Device1, Device3 and Device4 listen); Device3 transmits a short packet (containing geo-location information pertaining to Device3) on ChannelC (while Device1, Device2 and Device4 listen); Device4 transmits a short packet (containing geo-location information pertaining to Device4) on ChannelD (while Device1, Device2 and Device3 listen); Device1 transmits a short packet (containing geo-location information pertaining to Device1) on ChannelE (while Device2, Device3 and Device4 listen); Device2 transmits a long packet (containing geo-location information pertaining to Device2) on ChannelA (while Device1, Device3 and Device4 listen); Device3 transmits a short packet (containing geo-location information pertaining to Device3) on ChannelB (while Device1, Device2 and Device4 listen); etc.

By way of example, if all devices only transmitted long packets, there could be perceivable latency in the squad communications. Additionally, transmitting short packets require less battery costs than do long packets because the short packets are on-air for less time than are long packets. In one or more embodiments, though, more precise geo-location information can be contained within short packets than within long packets (because the short packets are transmitted with a higher data rate). More precise geo-location information can be particularly useful to users within a close (or closer) proximity to each other, while such precision may be less useful for users that are farther away from each other. For instance, the farther away a user is, the less frequently that user may need to receive data from another user (with respect to where exactly that other user is located). Also, in one or more embodiments, users far enough away from each other might only receive transmissions of long packets.

Further, one or more embodiments include facilitating and/or enabling multiple different squads operating in the same area or general location without having to negotiate with respect to which squad uses which frequency. Such an embodiment also includes providing each squad with (or enabling a squad leader device to generate) a start offset that is generated from a random number. For example, assume a scenario involving two squads, both of the same size (that is, having the same number of devices in the squad), and both squads having the same number of channels in their hop set. In one or more embodiments, each of those channels can be distinct/different due to the random start offset used by each squad, as well as the manner in which each squad proceeds through their respective hop set (that is, the ordering of the channels that is selected and/or used by that particular squad).

Because, in one or more embodiments, the devices are de-centralized, a leader device of a squad can generate the random start offset as well as the custom or random channel order within the hop set, and subsequently inform the rest of the devices in the squad.

Figure 5:
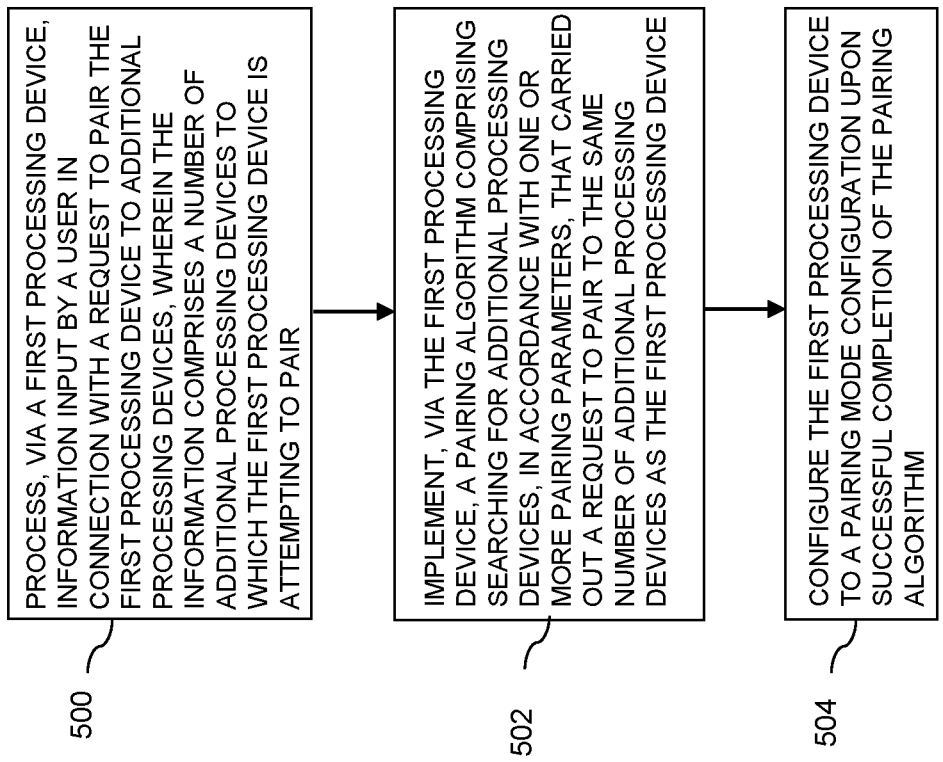
FIG. 5 is a flow diagram of a process for pairing multiple devices into a designated group for a communication session in an illustrative embodiment.

FIG. 5 is a flow diagram of a process for pairing multiple devices into a designated group for a communication session in an illustrative embodiment. It is to be understood that this particular process is only an example, and additional or alternative processes can be carried out in other embodiments.

In this embodiment, the process includes steps 500 through 504. These steps are assumed to be performed by the processor 120 utilizing module 130.

Step 500 includes processing, via a first processing device, information input by a user in connection with a request to pair the first processing device to one or more additional processing devices, wherein the information comprises a number of additional processing devices to which the first processing device is attempting to pair.

Step 502 includes implementing, via the first processing device, a pairing algorithm, wherein the pairing algorithm comprises searching for one or more additional processing devices, in accordance with one or more temporal values associated with the input of the first processing device and one or more pairing parameters, that carried out a request to pair to the same number of additional processing devices as the first processing device. The one or more pairing parameters can include, for example, geographic proximity of one or more additional processing devices, signal strength attributed to one or more additional processing devices, etc.

In at least one embodiment, the pairing algorithm includes applying one or more filtering techniques, wherein the filtering techniques include filtering additional processing devices based on one or more predetermined criteria (such as, for example, one or more temporal parameters, radio signal strength, etc.). In one or more embodiments, the pairing algorithm includes a multicasting node discovery procedure.

In such an embodiment, the multicasting node discovery procedure includes the first processing device alternately (i) transmitting one or more data packets and (ii) monitoring for one or more data packets meeting one or more predetermined criteria set by one or more additional processing devices. The one or more predetermined criteria can include, for example, one or more data packets exceeding a predetermined received signal strength indicator threshold transmitted by one or more additional processing devices.

Additionally, the multicasting node discovery procedure also includes the first processing device generating a table based on one or more unique device identifiers received from the one or more additional processing devices that transmitted the one or more data packets meeting at least one of the one or more predetermined criteria. Further, the multicasting node discovery procedure includes the first processing device generating and broadcasting an acknowledgement message upon a determination that the number of unique device identifiers in the table is equal to the number of additional processing devices to which the first processing device is attempting to pair. Also, in such an embodiment, the multicasting node discovery procedure is completed upon receipt, by the first processing device, of broadcast acknowledgement messages from additional processing devices equal in number to the number of additional processing devices to which the first processing device is attempting to pair. Additionally, in one or more embodiments, the multicasting node discovery procedure is completed upon expiration of a temporal limitation associated with the pairing algorithm.

Step 504 includes configuring the first processing device to a pairing mode configuration upon successful completion of the pairing algorithm. Configuring the first processing device to a pairing mode includes updating one or more communication method variables attributed to the first processing device. By way merely of example, the one or more communication method variables can include one or more time-division multiplexing variables.

Another embodiment includes an example system which contains a communications network and multiple processing devices, each of the multiple processing devices configured to process information input by a respective user in connection with a request to pair the processing device to one or more of the other processing devices, wherein the information comprises a given number of the multiple processing devices to which the respective user is attempting to pair the processing device. Additionally, in such an embodiment, each of the multiple processing devices in the system is also configured to implement a pairing algorithm, wherein the pairing algorithm comprises monitoring, over the communications network, for communications from the other processing devices, wherein the communications (i) comprise a request to pair to the given number of the multiple processing devices, (ii) are in accordance with one or more temporal values associated with the processing information input by the respective user, and (iii) are in accordance with and one or more pairing parameters. Further, in such an embodiment, each of the multiple processing devices in the system is additionally configured to configure to a distinct pairing mode configuration upon successful completion of the pairing algorithm, and to establish an exclusive communication session over the communications network with the given number of the multiple processing devices configured to the distinct pairing mode configuration.

Other techniques can be used in association with one or more embodiments of the disclosure. Accordingly, the particular processing operations and other network functionality described in conjunction with the flow diagram of FIG. 5 and the techniques detailed herein are presented by way of illustrative example only, and should not be construed as limiting the scope of the invention in any way. For example, the ordering of the process steps may be varied in one or more other embodiments, or certain steps may be performed concurrently with one another rather than serially. Also, the process steps or subsets thereof may be repeated periodically in conjunction with respective distinct instances of squad sessions with respect to different users.

The above-described example embodiments provide significant advantages relative to conventional approaches. For example, one or more embodiments include creating and/or providing increased immunity to interference, preclusion of a need for a centralized communication requirement, as well as long range and low power capabilities.

It is to be appreciated that the foregoing advantages are illustrative of advantages provided in certain embodiments, and need not be present in other embodiments.

Additionally, the networks disclosed herein can be implemented, for example, using one or more processing platforms. Such a processing platform can include, by way of example, at least one processing device comprising a processor coupled to a memory.

In one or more embodiments, portions of a network as disclosed herein can illustratively include cloud infrastructure. The cloud infrastructure, in at least one such embodiment, can include a plurality of containers implemented using container host devices, and/or can include container-based virtualization infrastructure configured to implement Docker containers or other types of Linux containers.

The cloud infrastructure can additionally or alternatively include other types of virtualization infrastructure such as virtual machines implemented using a hypervisor. Additionally, the underlying physical machines include one or more distributed processing platforms that include one or more storage systems.

Such cloud infrastructure as described above can, by way of example, represent at least a portion of one processing platform. Another example of such a processing platform can include, as similarly detailed above in connection with FIG. 1, a plurality of processing devices which communicate with one another over a network. As yet another processing platform example, portions of a given processing platform in one or more embodiments can include converged infrastructure.

The particular processing platforms described above are presented by way of example only, and a given network such as network 100 can include additional or alternative processing platforms, as well as numerous distinct processing platforms in any combination, with each such platform comprising one or more computers, servers, storage devices and/or other processing devices.

Further, in accordance with one or more embodiments, processing devices and other network components can communicate with one another using a variety of different communication protocols and associated communication media.

It should again be emphasized that the embodiments described herein are presented for purposes of illustration only. Many variations may be made in the particular arrangements shown. Moreover, the assumptions made herein in the context of describing one or more illustrative embodiments should not be construed as limitations or requirements of the invention, and need not apply in one or more other embodiments. Numerous other alternative embodiments within the scope of the appended claims will be readily apparent to those skilled in the art.

What is claimed is:

1. A computer-implemented method comprising:
processing, via at least a portion of multiple processing devices, information associated with a network in connection with one or more device pairing requests from one or more of the multiple processing devices;
implementing, via at least one of the multiple processing devices, at least one pairing algorithm, wherein the at least one pairing algorithm comprises searching for one or more of the multiple processing devices, in accordance with (i) one or more temporal values associated with the at least one processing device and at least one of the one or more device pairing requests corresponding thereto, and (ii) one or more pairing parameters; and pairing, via the network and based at least in part on the at least one pairing algorithm, the at least one processing device to one or more of the multiple processing devices, wherein pairing comprises implementing, in the at least one processing device and the one or more processing devices paired thereto, a signal transmission schedule comprising a sequence of temporally-based signal transmission slots and processing device identifiers associated therewith.

2. The computer-implemented method of claim 1, wherein the at least one pairing algorithm comprises a multicasting node discovery procedure.

3. The computer-implemented method of claim 2, wherein the multicasting node discovery procedure comprises the at least one processing device alternately (i) transmitting one or more data packets and (ii) monitoring for one or more data packets meeting one or more predetermined criteria set by one or more of the multiple processing devices.

4. The computer-implemented method of claim 3, wherein the one or more predetermined criteria comprises one or more temporal values of one or more data packets transmitted by one or more of the multiple processing devices.

5. The computer-implemented method of claim 3, wherein the multicasting node discovery procedure comprises the at least one processing device generating a table based on one or more unique device identifiers associated with the one or more processing devices that transmitted the one or more data packets meeting at least one of the one or more predetermined criteria.

6. The computer-implemented method of claim 1, wherein the at least one pairing algorithm is completed upon expiration of a temporal limitation associated with the at least one pairing algorithm.

7. The computer-implemented method of claim 1, wherein pairing comprises updating one or more communication method variables attributed to the at least one processing device.

8. The computer-implemented method of claim 1, wherein the one or more pairing parameters comprise geographic proximity of one or more of the multiple processing devices.

9. The computer-implemented method of claim 1, wherein the at least one pairing algorithm comprises applying one or more filtering techniques.

10. The computer-implemented method of claim 9, wherein the one or more filtering techniques comprise one or more of filtering one or more of the multiple processing devices based on one or more temporal parameters and filtering one or more of the multiple processing devices based on one or more predetermined criteria.

11. A non-transitory processor-readable storage medium having stored therein program code of one or more software programs, wherein the program code when executed by at least one processing device causes the at least one processing device to carry out the method of claim 1.

12. The computer-implemented method of claim 1, further comprising:
re-pairing, subsequent to a failure of one or more of the pairing, at least one packet transmission, and implementation of one or more temporal parameters, the at least one processing device to the one or more processing devices, wherein re-pairing comprises one or more of the at least one processing device and at least one of the one or more processing devices using the signal transmission schedule implemented in connection with the pairing.

13. An apparatus comprising:
at least one processing device comprising a processor coupled to a memory;
the at least one processing device being configured:
to process information associated with a network in connection with a request to pair with one or more additional processing devices;
to implement at least one pairing algorithm, wherein the at least one pairing algorithm comprises searching for one or more additional processing devices, in accordance with (i) one or more temporal values associated with the at least one processing device and the request, and (ii) one or more pairing parameters; and
to pair, via the network and based at least in part on the at least one pairing algorithm, to at least one of the one or more additional processing devices, wherein pairing comprises implementing, in the at least one processing device and the at least one of the one or more additional processing devices paired thereto, a signal transmission schedule comprising a sequence of temporally-based signal transmission slots and processing device identifiers associated therewith.

14. The apparatus of claim 13, wherein the one or more pairing parameters comprise geographic proximity of the one or more additional processing devices.

15. The apparatus of claim 13, wherein the at least one pairing algorithm comprises applying one or more filtering techniques, wherein the one or more filtering techniques comprise filtering one or more of the multiple processing devices based on one or more temporal parameters.

16. The apparatus of claim 13, wherein the at least one processing device is further configured:
to re-pair, subsequent to a failure of one or more of the pairing, at least one packet transmission, and implementation of one or more temporal parameters, the at least one processing device to the at least one of the one or more additional processing devices, wherein re-pairing comprises one or more of the at least one processing device and the at least one of the one or more additional processing devices using the signal transmission schedule implemented in connection with the pairing.

17. A system comprising:
a communications network; and
multiple processing devices, each given one of the multiple processing devices configured:
to process information associated with the communications network in connection with a request to pair with one or more of the multiple processing devices;
to implement at least one pairing algorithm, wherein the at least one pairing algorithm comprises searching for one or more of the multiple processing devices, in accordance with (i) one or more temporal values associated with the requesting processing device and the request, and (ii) one or more pairing parameters; and
to pair, via the communications network and based at least in part on the at least one pairing algorithm, to at least one of the multiple processing devices, wherein pairing comprises implementing, in the given processing device and the at least one of the multiple processing devices, a signal transmission schedule comprising a sequence of temporally-based signal transmission slots and processing device identifiers associated therewith.

18. The system of claim 17, wherein the one or more pairing parameters comprise geographic proximity of one or more of the multiple processing devices.

19. The system of claim 17, wherein the at least one pairing algorithm comprises applying one or more filtering techniques, wherein the one or more filtering techniques comprise filtering one or more of the multiple processing devices based on one or more temporal parameters.

20. The system of claim 17, wherein each of the multiple processing devices is further configured:
   to re-pair, subsequent to a failure of one or more of the pairing, at least one packet transmission, and implementation of one or more temporal parameters, the given processing device and the at least one of the multiple processing devices, wherein re-pairing comprises one or more of the given processing device and the at least one of the multiple processing devices using the signal transmission schedule implemented in connection with the pairing.

* * * * *